United States Patent
Tomioka et al.

(10) Patent No.: US 7,189,439 B2
(45) Date of Patent: *Mar. 13, 2007

(54) ACTIVE MATRIX TYPE LIQUID CRYSTAL DISPLAY APPARATUS

(75) Inventors: Yasushi Tomioka, Hitachi (JP); Takao Miwa, Hitachinaka (JP); Katsumi Kondo, Hitachinaka (JP); Hisao Yokokura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 10/732,279

(22) Filed: Dec. 11, 2003

(65) Prior Publication Data

US 2004/0170777 A1    Sep. 2, 2004

Related U.S. Application Data

(62) Division of application No. 09/071,879, filed on May 4, 1998, now Pat. No. 6,682,783.

(30) Foreign Application Priority Data

May 16, 1997 (JP) .................................. 9-126708
Dec. 5, 1997 (JP) .................................. 9-335283

(51) Int. Cl.
*G02F 1/1337* (2006.01)

(52) U.S. Cl. .................. 428/1.2; 349/123; 349/135

(58) Field of Classification Search .......... 428/1.2–1.3; 349/123–124, 135, 96
See application file for complete search history.

(56) References Cited

U.S. PATENT DOCUMENTS

| | | | | |
|---|---|---|---|---|
| 5,064,697 A | * | 11/1991 | Takiguchi et al. ......... 428/1.26 |
| 5,128,788 A | * | 7/1992 | Takatoh et al. ............ 349/124 |
| 5,280,375 A | * | 1/1994 | Tsuda et al. ................ 349/128 |
| 5,464,669 A | * | 11/1995 | Kang et al. ................. 427/558 |
| 5,477,360 A | * | 12/1995 | Sunohara et al. .......... 349/132 |
| 5,585,951 A | * | 12/1996 | Noda et al. ................. 349/122 |
| 5,596,435 A |   | 1/1997 | Sunohara et al. |
| 5,604,615 A | * | 2/1997 | Iwagoe et al. ............. 349/124 |

(Continued)

FOREIGN PATENT DOCUMENTS

JP    63-21907    5/1988

(Continued)

*Primary Examiner*—Rena Dye
*Assistant Examiner*—Sow-Fun Hon
(74) *Attorney, Agent, or Firm*—Antonelli, Terry, Stout and Kraus, LLP.

(57) ABSTRACT

An active matrix type liquid crystal display apparatus has a pair of substrates, at least one of the substrates being transparent; a liquid crystal layer arranged between the pair of substrates; and electrode structure for generating an electric field having a dominant component parallel to a surface of the substrate and passing through the liquid crystal layer, the electrode structure being formed on one of the pair of substrates; a pair of alignment layers formed on respective surfaces in contact with the liquid crystal layer of the pair of substrates; and a pair of polarizing plates arranged so as to sandwich the pair of substrates, wherein the glass transition temperature Tg of a boundary surface between said liquid crystal layer and the alignment layer is higher than the nematic-isotropic phase transition temperature T(N-I) of a liquid crystal composite forming the liquid crystal layer.

33 Claims, 4 Drawing Sheets

U.S. PATENT DOCUMENTS

| | | | |
|---|---|---|---|
| 5,726,728 A * | 3/1998 | Kondo et al. | 349/156 |
| 5,745,207 A | 4/1998 | Asada et al. | |
| 5,751,382 A * | 5/1998 | Yamada et al. | 349/12 |
| 5,863,457 A | 1/1999 | Hasebe et al. | |
| 5,928,733 A * | 7/1999 | Yoneya et al. | 428/1.3 |
| 5,986,735 A * | 11/1999 | Komatsu | 349/128 |
| 6,222,605 B1 * | 4/2001 | Tillin et al. | 349/167 |
| 6,242,060 B1 * | 6/2001 | Yoneya et al. | 428/1.23 |
| 6,682,783 B1 * | 1/2004 | Tomioka et al. | 428/1.1 |
| 6,756,089 B2 * | 6/2004 | Yoneya et al. | 428/1.26 |
| 6,943,861 B2 * | 9/2005 | Tomioka et al. | 349/141 |

FOREIGN PATENT DOCUMENTS

| | | |
|---|---|---|
| JP | 0635 533 A1 * | 1/1995 |
| JP | 7-121138 | 5/1995 |
| JP | 07-261180 | 10/1995 |

* cited by examiner

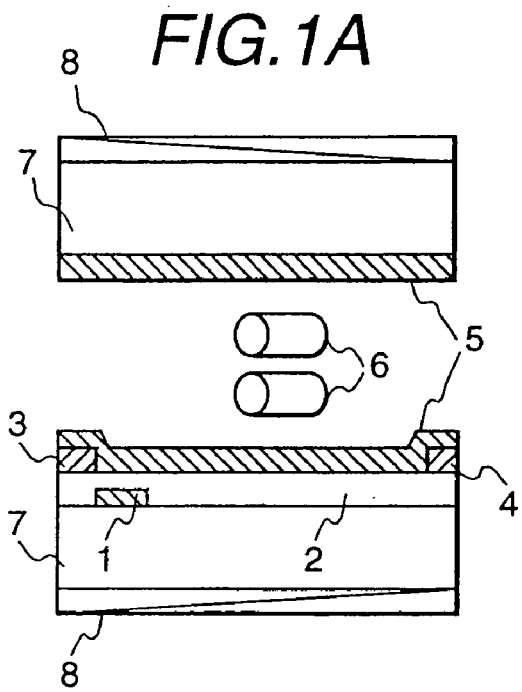
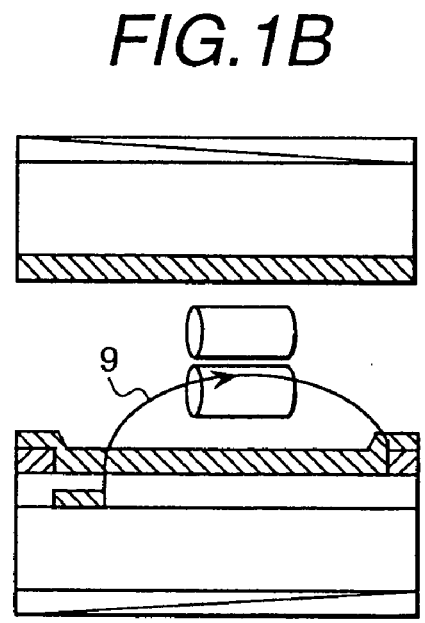
FIG.1A    FIG.1B
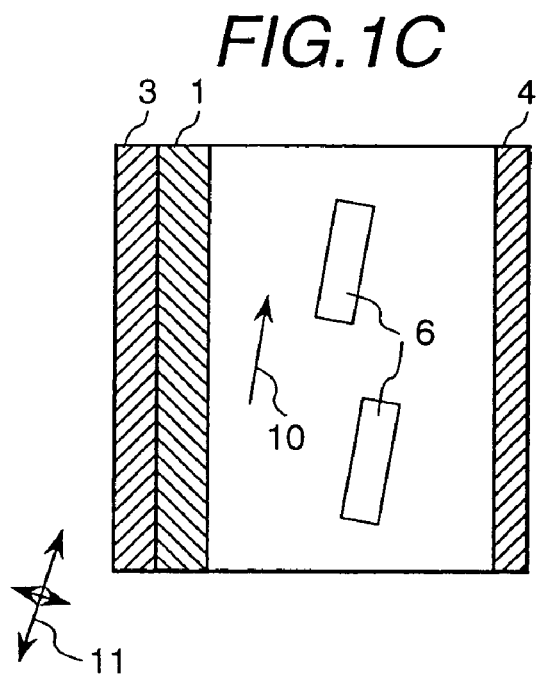
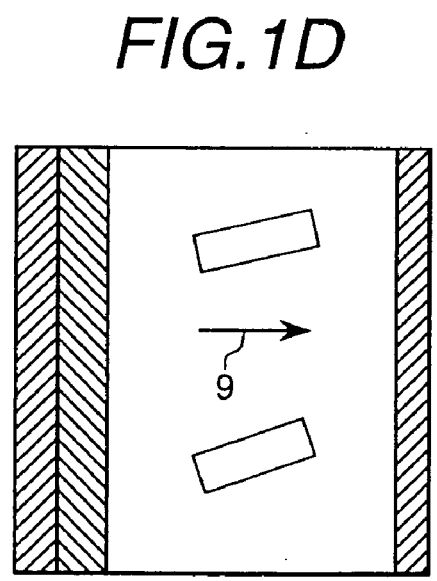
FIG.1C    FIG.1D

ACTIVE MATRIX TYPE LIQUID CRYSTAL DISPLAY APPARATUS

CROSS-REFERENCE TO RELATED APPLICATIONS

This application is a division of application Ser. No. 09/071,879 filed on May 4, 1998, now U.S. Pat. No. 6,682,783. The contents of application Ser. No. 09/071,879 are hereby incorporated herein by reference in their entirety.

BACKGROUND OF THE INVENTION

The present invention relates to an active matrix type liquid crystal display apparatus, particularly, to an active matrix type liquid crystal display apparatus of the in-plane switching type, wherein a liquid crystal is driven by generating and applying an electric field nearly in parallel to the surface of the substrate.

Display of information by a liquid crystal display apparatus is performed by applying an electric field to liquid crystal molecules in a liquid crystal layer interposed between substrates to change the orientation of the liquid crystal molecules and to utilize the change in the optical properties of the liquid crystal caused by the change of the orientation of the liquid crystal to produce a display.

An active matrix type liquid crystal display apparatus of a twisted nematic display (TN) type is typical of a conventional active matrix type liquid crystal display apparatus. In the active matrix type liquid crystal display apparatus of a twisted nematic display type, display of information by the liquid display apparatus is performed by applying an electric field nearly perpendicular to the surface of the substrate to the liquid crystal and utilizing the optical rotating power of the liquid crystal to control optical properties of a display. On the other hand, an active matrix type liquid crystal display apparatus of an in-plane switching type has been proposed, for example, in Japanese Patent Laid-Open No. 63-21907.

In the active matrix type liquid crystal display apparatus of an in-plane switching type, display of information by the liquid crystal display apparatus is performed by applying an electric field nearly in parallel to the surface of a substrate using interdigitated electrodes and utilizing birefringence of the liquid crystal to control optical properties of the display. The in-plane switching mode has the advantages of providing a wider viewing angle and lower storage capacitance compared to the conventional twisted nematic type and, accordingly, is a promising technology for the active matrix type liquid crystal display apparatus.

With the recent trend of high speed response of the active matrix type liquid crystal display apparatus, there occurs a display problem in the form of a so-called after image in the liquid crystal display elements, that is, an image retention phenomenon. The term image retention phenomenon, that is, the after image problem, refers to a state wherein there occurs a zone having a very slow response compared to a normal liquid crystal response speed of approximately 50 milliseconds. Occurrence of the after image phenomenon in the conventional twisted nematic type liquid crystal display apparatus is caused by accumulating a direct current charge in a boundary surface of a liquid crystal alignment layer of each pixel to change the effective voltage. In other words, the after image phenomenon is caused by the fact that an electric potential at the time of application of the voltage is not eliminated within the response time and is held in the alignment layer on the pixel electrode or the boundary surface of the liquid crystal alignment layer to change the effective voltage applied to the liquid crystal layer. The relationship between the after image phenomenon and the residual direct current voltage component has been studied, and, at the present time, it is being suggested that the after image phenomenon can be improved by decreasing the residual direct current voltage. Therefore, as the alignment layer of the conventional twisted nematic mode, an alignment layer having a property of hardly accumulating a direct current charge, that is, having less residual direct current voltage component, is required.

SUMMARY OF THE INVENTION

On the other hand, the image retention (after image) phenomenon also occurs in a liquid crystal display apparatus of the in-pane switching type, and consequently it causes a problem in that the image quality is decreased by reduction of the dark level, reduction of contrast and the occurrence of gray scale reversal between adjacent pixels, and the productivity is decreased by reduction of yield. The direct current voltage remaining in the pixel electrode, which relates to the after image phenomenon in a conventional liquid crystal display apparatus of the twisted nematic type, also has been measured in a liquid crystal display apparatus of the in-plane switching type. The results show that (1) there is little significant difference in the residual direct current voltage value between a liquid crystal display element producing an after image and a liquid crystal display element not producing an after image, (2) there are some liquid crystal display apparatuses of the in-plane switching type in which the image retention problem semi-permanently continues to cause substantial decrease in the contrast. Further, it has been clarified from an inspection of the orientation of the liquid crystal in an after image and image retention zone that a liquid crystal which rotates from the initial set orientation toward the driven orientation by a very slight angle, does not completely return to the initial orientation. From the above-mentioned points, it can be seen that the after image and image retention phenomenon in the in-plane switching mode is based on a special after image mechanism of the in-plane switching mode which is completely different from that of the conventional twisted nematic mode, and therefore it is necessary to independently solve the special image retention and after image problem of the in-plane switching mode. Hereinafter, the after image is referred to as an in-plane switching (IPS) after image.

An object of the present invention is to provide a high image quality active matrix type liquid crystal display apparatus which has little display unevenness due to image retention by solving the above-mentioned problem in an active matrix type liquid crystal display apparatus using the in-plane switching mode.

Another object of the present invention is to provide a high image quality active matrix type liquid crystal display apparatus which is suitable for mass-production.

An active matrix type liquid crystal display apparatus in accordance with the present invention comprises a pair of substrates, at least one of the substrates being transparent; a liquid crystal layer arranged between the pair of substrates; an electrode structure for generating an electric field having a dominant component parallel to a surface of the substrate in the liquid crystal layer, the electrode structure being formed on one of the pair of substrates; a pair of alignment layers formed on respective surfaces in contact with the liquid crystal layer of the pair of substrates; and a pair of polarizing plates arranged so as to sandwich the pair of substrates, wherein the glass transition temperature Tg of a boundary surface between the liquid crystal layer and the alignment layer, or the glass transition temperature Tg of a surface of the alignment layer is higher than a nematic-isotropic phase transition temperature T(N-I) of a liquid crystal composite forming the liquid crystal layer.

According to another aspect of the present invention, the surface modulus of elasticity of the pair of alignment layer is not less than 1 GPa.

Further, according to still another aspect of the present invention, the glass transition temperature Tg of the alignment layer is not lower than 300° C.

It is preferable that the anchoring strength $A_2$ in the azimuthal direction of a surface of the alignment layer to liquid molecules in the boundary surface between the alignment layer and the liquid crystal layer is less than 20 μN/m.

As a method of changing an optical characteristic depending on the orientation of the liquid crystal molecules, it is preferable that a parameter d·Δn satisfies the relation $0.2 \mu m < d \cdot \Delta n < 0.5 \mu m$ using a pair of polarizing plates having polarizing axes crossing each other at nearly a right angle, where Δn is the anisotropy of refractive index and d is the thickness of the liquid crystal layer.

It is preferable that at least one of the pair of alignment layers formed on the respective substrates is made of an organic polymer of polyamic acid imide group, polyimide group, polyimide siloxane group and polyamide imide group.

It is preferable that a weight average molecular weight of the organic polymer is not smaller than 10,000 and not larger than 300,000.

It is preferable that the alignment layer is made of an organic polymer of dehydration ring closure of polyamic acid composed of diamine compounds expressed by the chemical formula of $H_2N$—R—$NH_2$ and tetracarboxylic acid anhydride, total number including bonding group in the meta position and in the ortho position of bonding group of —O—, —S—, —$CH_2$—, —$C(CH_3)_2$—, —$C(CF_3)_2$—, —$SO_2$— making molecular axis of the polymer rotatable in R and X in the repeating structure of the organic polymer being less than 3, the tetracarboxylic acid anhydride being expressed by the following chemical formula.

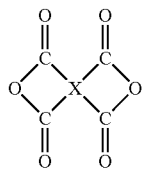

(Chemical Formula 1)

An inorganic material layer or a photoreactive material layer can be used for at least one of the pair of alignment layers. Particularly, it is effective when the photoreactive material layer comprises an organic polymer containing a polymer and/or an oligomer containing at least one kind of diazobenzene group and derivatives of diazobenzene group, the photoreactive material layer comprises an organic polymer containing a polymer and/or an oligomer containing at least one kind of stilbene group and derivatives of a stilbene group, and orientation control by irradiation of polarized light is used. Further, it is particularly effective in a case where the photoreactive material is an organic polymer containing a polymer precursor curable by irradiating heat or light or radiation rays, or a case where a transparent organic polymer layer having a thickness thicker than the thickness of the alignment layer is interposed between the alignment layer and the substrate.

It is also more effective when a pretilt angle of the liquid crystal layer is not larger than 5 degrees.

BRIEF DESCRIPTION OF THE DRAWINGS

These and other objects, features and advantages of the present invention will be understood more clearly from the following detailed description when taken with reference to the accompanying drawings, wherein:

FIGS. 1A to 1D are diagrams showing the operation of a liquid crystal in a liquid crystal display apparatus in accordance with the present invention, wherein FIG. 1A is a view showing a state during which a voltage is not applied, and FIG. 1B is a view showing a state during application of a voltage;

FIGS. 4A and 4B are cross-sectional side views taken on the planes of the lines A–A' and B–B', respectively, in FIG. 4.

DESCRIPTION OF THE PREFERRED EMBODIMENTS

Figure 2:
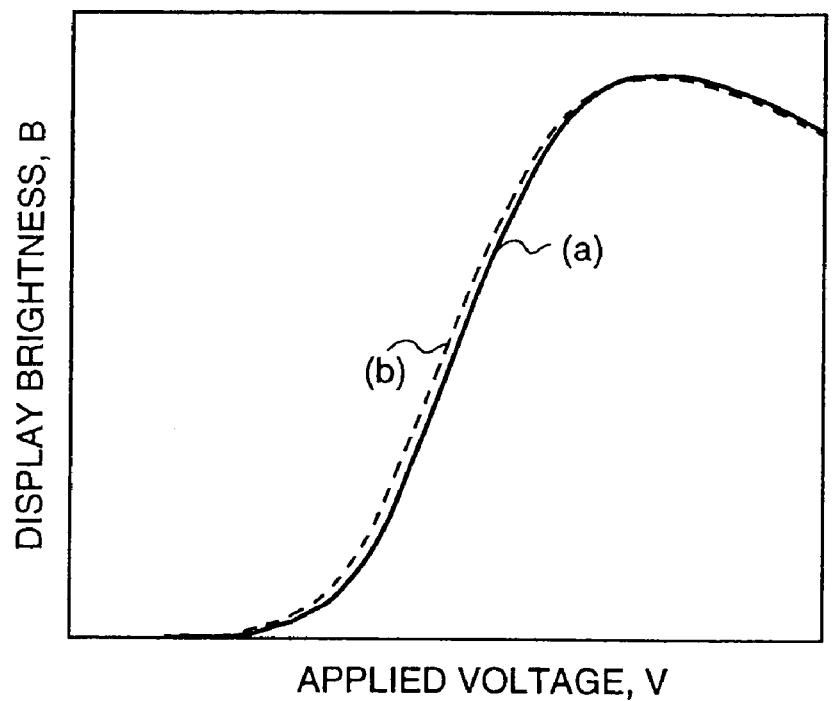
FIG. 2 is a graph explaining the electric-optical properties of the present invention, wherein a curve (a) is a base voltage-brightness curve, and a curve (b) is a voltage-brightness curve showing the after image phenomenon.

Initially, a description will be given of the principle of operation of the in-plane switching mode, which is the premise of the present invention, referring to FIGS. 1A to 1D. Each of FIG. 1A and FIG. 1B is a cross-sectional side view showing operation of the liquid crystal in one pixel of a liquid crystal element of the in-plane switching mode, and each of FIG. 1C and FIG. 1D is the front view thereof, respectively. FIG. 1A is a cross-sectional side view showing the state of a cell when not applying a voltage, and FIG. 1C is the front view at that time. Line electrodes 1, 4 are formed on the inner side of one of the substrates, and an alignment layer 5 is formed on the substrate surface of each of the pair of substrates, and a liquid crystal composition is interposed between the substrates. The anisotropy of the dielectric constant of the liquid crystal composition is assumed to be positive in this embodiment. In a case of a negative anisotropy of the dielectric constant of the liquid crystal composition, the in-plane switching mode also can be realized simply by exchanging the directions of the major axis and the minor axis of the liquid crystal molecules.

The rod-shaped liquid crystal molecules 6 are controlled so as to oriented in a direction 10 having a certain angle relative to the longitudinal direction (see FIG. 1C) of both electrodes 1, 4 on the boundary surfaces of both substrates by coupling with the alignment layer 5, and are in the state where the liquid crystal molecules are nearly uniformly oriented in the initial oriented direction in the liquid crystal layer under the condition where a voltage is not applied. Therein, when different voltages are applied to a pixel electrode 4 and a common electrode 1 whereby an electric field 9 is applied to the liquid crystal composition layer due to the electric potential difference between the pixel electrode 4 and the common electrode 1, the liquid crystal molecules are oriented in the direction of the electric field as shown in FIG. 1B, D by the interaction of the anisotropy of dielectric constant of the liquid crystal composition and the electric field. At that time, the optical property of the liquid crystal element is changed by the action of the anisotropy of refractive index of the liquid crystal composition layer and the polarizing plates 8. Display is can be performed by the change.

FIG. 2 is a graph schematically showing the relationship between the applied voltage between the electrodes and the displayed brightness of a liquid crystal display apparatus of in-plane switching type. The solid line (a) of FIG. 2 indicates a base voltage-brightness curve in the initial state, and the dotted line (b) of FIG. 2 indicates a voltage-brightness curve in a case of a typical after image (in-plane retention after image) phenomenon. As described above, the after image and image retention phenomenon is caused by a substantial variation of the brightness in a dark level or gray level region where the sense of sight of a human being is sensitive.

The mechanism of the after image will be described below.

Figure 3:
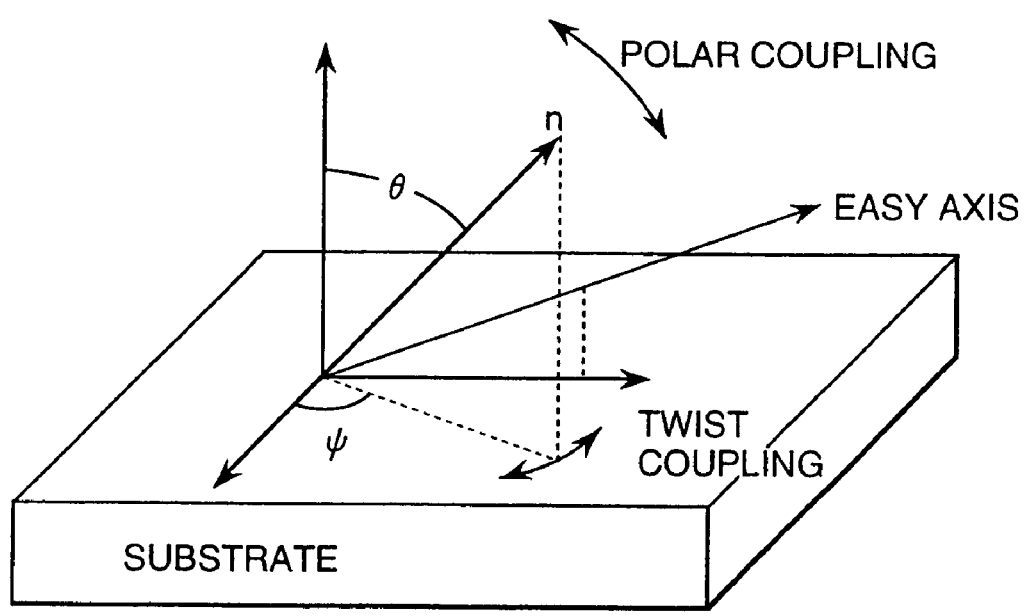
FIG. 3 is a diagram showing a polar coupling and a twist coupling between a liquid crystal molecule and a substrate surface.

It is known that the anchoring strength (coupling force) due to the coupling between the alignment layer and the liquid crystal molecules substantially varies depending on the materials of the alignment layer and the conditions of the alignment treatment with rubbing. However, the anchoring strength also varies depending on the directions of the orientation change of the liquid crystal molecules. Taking a liquid crystal material having a positive anisotropy of dielectric constant aligned nearly parallel to the surface, in the twisted nematic mode where the electric field is applied nearly perpendicular to the substrate surface, the orientation change of the liquid crystal molecules on the substrate surface caused by an applied voltage is toward a direction rising from the substrate surface (the polar direction shown in FIG. 3). On the other hand, in the in-plane switching mode where the electric field is applied nearly parallel to the substrate surface, the orientation change of the liquid crystal molecules on the substrate surface caused by an applied voltage is toward a direction inside the substrate surface (the twist rotation direction on the surface shown in FIG. 3). Therefore, it is thought that in the conventional twisted nematic mode, the difficulty in returning from an orientation change of the liquid crystal molecules in the polar direction corresponds to the image retention and after image problem, and is also caused by the direct current voltage remaining near the pair of upper and lower electrodes. On the other hand, in the in-plane switching mode, the difficulty in returning from the twist deformation of the liquid crystal molecules in the direction on the substrate surface corresponds to the image retention or after image problem. In addition to this, since the correlation between the after image and the direct current voltage remaining near the pixel electrodes is not observed in the in-plane switching mode, as described above, the image retention or after image problem is not due to an electrical cause, but rather is due to an interaction between the liquid crystal and the boundary surface of the alignment layer.

The present inventors have studied hard and have clarified that the mechanism which results in occurrence of the image retention or after image problem in the in-plane switching mode is caused as follows. That is, the surface of the alignment layer retaining the direction 10 of the initial alignment of the liquid crystal molecules is elastically deformed by rotational torque generated on the basis of twist deformation on the surface of the liquid crystal molecules produced by the applied electric field, and the deformation and the creep appear as an elastic recovery with a retardative elastic deformation special in polymers, that is, as an after image phenomenon in which residual stress recovers with a finite retardation time, or as an image retention phenomenon in which the residual stress remains as a permanent deformation.

Therefore, in order to reduce the occurrence of such an after image phenomenon, it is effective when (1) the magnitude of the rotational torque due to the inner surface twist deformation is decreased by using a liquid crystal composition having a small twist elastic constant, or (2) the hardness (elastic modulus) of the alignment layer is increased by forming a high elastic polymer surface hardly affected by the effect of the rotational torque due to the driving of the liquid crystal molecules. Further, it is effective when (3) a boundary surface having a weak anchoring strength in the azimuthal direction is formed so that the rotational torque of the liquid crystal layer propagates to the alignment layer.

In order to increase the modulus of elasticity of the alignment layer, it is preferable when the molecular structure of a polymer forming the alignment layer is a structure having stiffness and straightness, and it is better when the molecular weight is as large as possible. It is also preferable when a higher order network is formed to mechanically increase the strength of the alignment layer by photo-cross-linking reaction after applying, curing and alignment treatment with rubbing. By increasing the molecular weight above 10,000, the cohesive forces between polymer chains can be increased, and, consequently, the modulus of elasticity can be increased. However, when the molecular weight exceeds 300,000, entanglement of the polymer chain occurs in the alignment layer varnish in a melting condition, and the polymer chain is prevented from forming a high density packing.

Further, it is preferable when the total number including the bonding group in the meta position and in the ortho position of the bonding group of —O—, —S—, —CH$_2$—, —C(CH$_3$)$_2$—, C(CF$_3$)$_2$—, —SO$_2$—, which make the molecular axis of the polymer rotatable, is less than 3. The reason for this is that diffusion between the main chain of the polymer hardly occurs, but the modulus of elasticity of molecules of the alignment layer is decreased because rotation around the molecular axis becomes easy and local thermal movement becomes possible when there is a large number of the bonding group described above. Such a phenomenon is known as side chain relaxation (Tg(b)), which appears in temperature dependence on the modulus of elasticity. In the alignment layer used in the conventional twist nematic mode, a method of employing side chains of a normal alkyl group is used in order to control the pretilt angle. In the in-plane switching mode, from the viewpoint of keeping a wide viewing angle and the viewpoint described above, a preferable polymer is one having a small number of side group chromophore which is branched from a long chain, such as a normal alkyl group producing the pretilt angle, or one not having a bulky side chain substituent at all. Therefore, by employing such a polymer as the alignment layer, the pretilt angle (boundary surface tilt angle) can be suppressed below 5 degrees, and it is also effective to keep a wide viewing angle, which is one of the characteristics of the in-plane switching mode.

It is known that the modulus of elasticity of the polymer alignment layer is substantially affected by environmental conditions, particularly, by temperature. From this viewpoint, the glass transition temperature Tg of the alignment layer polymer may be used as an index other than the modulus of elasticity itself to select the alignment layer having a high modulus of elasticity, as described above. A higher modulus of elasticity of the alignment layer can be guaranteed as the glass transition temperature Tg is higher. From the relationship between the glass transition temperature Tg and the magnitude of the after image of the in-plane switching mode, it has been clarified that an alignment layer having a glass transition temperature Tg exceeding 300° C. can decrease an after image to a degree satisfying an allowable value of display performance. Therefore, it is preferable to employ a polymer capable of having a glass transition temperature Tg above 300° C. for the alignment layer. Since the glass transition temperature Tg is a bulk value of the alignment layer polymer, the glass transition temperature Tg on the alignment layer surface in connection with the boundary surface of the actual liquid crystal alignment layer is estimated to decrease by 100° C. at a maximum. Therefore, it is considered that the modulus of elasticity of the boundary surface of the actual liquid crystal alignment layer is hardly reduced within the guaranteed actual operation range of −30° C. to 70° C. Further, in an actually used liquid crystal cell, it can be considered that there is the following relationship between the glass transition temperature Tg in the boundary surface between the alignment layer and the liquid crystal layer and the transition temperature T(N-I) of the nematic isotropic phase of the actually used liquid crystal. The magnitude of the rotational torque of the liquid crystal is proportional mainly to the twist elastic constant $K_2$ of the liquid crystal. The twist elastic constant $K_2$ of the liquid crystal gradually decreases as the temperature of the liquid crystal is increased and is rapidly increased at the transition temperature T(N-I) of the nematic isotropic phase. That is, at a temperature above T(N-I), the rotational torque of the liquid crystal becomes very small and the stress load on the alignment layer is largely decreased. Accordingly, in a case where the glass transition temperature Tg at a position near the surface of the alignment layer, or the boundary surface between the alignment layer and the liquid crystal layer, is higher than the T(N-I) temperature of the liquid crystal (Tg>T(N-I)), the surface of the alignment layer is in a state near a very hard glass state and is hardly elastically deformed by the rotational torque of the liquid crystal. That is, the after image (in-plane switching after image) special in the in-plane switching mode can be suppressed to the minimum value.

From the above viewpoint, amine component chemical compounds and other copolymerization chemical compounds as the synthetic materials of the alignment layer used in the present invention are as follows. For example, they are, as aromatic diamines, p-phenylene diamine, m-phenylene diamine, 2,4-diaminotoluene, 2,5-diaminotoluene, 2,6-diaminotoluene, diaminodulene, benzidine, o-tolidine, 3,3-dimethoxy benzidine, 4,4"-diaminoterphenyl, 1,5-diaminonaphthalene, 2,7-diaminofluorene, 4,4'-diaminodiphenyl ether, 4,4'-diaminodiphenyl sulfide, 4,4'-diaminodiphenyl methane, 3,3'-dimethyl-4,4'-diaminodiphenyl methane, 2,5-diaminopyridine, 4,4'-bis(p-aminophenoxy)biphenyl, 2-2'-bis{4-(p-aminophenoxy)phenyl propane, 2,2'-bis{4-(p-aminophenoxy)phenyl}hexafluoro-propane, 4-4'-bis(m-aminophenoxy)diphenyl sulfone and so on, but the invention is not limited to these.

On the other hand, acid component chemical compounds and other copolymerization chemical compounds are as follows. For example, as aromatic tetracarboxylic acid anhydride, they are pyromellitic acid anhydride, methyl-pyromellitic acid anhydride, dimethylene-trimellitic acid anhydride, 3,3',4,4'-benzophenone-tetracarboxylic acid anhydride, 3,3',4,4'-biphenyl-tetracarboxylic acid andydride, dimethylene-trimellitic acid anhydride, 2,3,6,7-naphthalene-tetracarboxylic acid anhydride, 3,3',4,4'-biphenyl-sulfone-tetracarboxylic acid anhydride, 3,3',4,4'-diphenylether-tetracarboxylic acid anhydride, 3,3',4,4'-diphenylmethane-tetracarboxylic acid anhydride; and as alicyclic-tetracarboxylic acid anhydrides, 1,2,3,4-butane-tetracarboxylic acid anhydride, 1,2,3,4-biscyclobutane-tetracarboxylic acid anhydride, 1,2,3,4-cyclopentane-tetracarboxylic acid anhydride, but the invention is not limited to these.

The following solvents having polarity can be used. That is, they are, for example, N-methyl-2-pyrrolidine, dimethylformamide, dimethyl-acetamide, dimethyl-sulfoxide, sulfolane, butyl-lactone, cresol, phenol, cyclohexanone, dimethyl-imidazolidine, dioxane, tetrahydrofuran, butylcellsolve, butyl-cellsolve acetate, acetophenone.

Further, the following surfactant may be mixed with or reacted with the organic polymer. For example, amino group silane coupling agents such as γ-aminopropyl-methyl-triethoxy silane, δ-aminopropyl-methyl-diethoxy silane, N-β (aminoethyl)γ-aminopropyl-trimethoxy silane; epoxy group silane coupling agents; titanate coupling agent; aluminum alcholate; aluminum chelate; zirconium chelate. Forming of the alignment layer may be performed by general methods of spin coating, printing, applying with a brush, and spraying.

The liquid crystals used are, for example, 4-substituent phenyl-4'-substituent cyclohexane, 4-substituent cyclohexyl-4'-substituent dicyclohexane, 4-substituent dicyclohexyl-4'-substituent diphenyl, 4-substituent-4"-substituent terphenyl, 4-substituent biphenyl-4'-substituent cyclohexane, 2-(4-substituent phenyl)-5-pyrimidine, 2-(4-substituent dioxysane)-5-phenyl, 4-substituent benzoic acid-4'-phenyl ester, 4-substituent cyclohexane carboxylic acid-4'-substituent phenyl ester, 4-substituent cyclohexane carboxylic acid-4'-substituent biphenyl ester, 4-(4-substituent cyclohexane carbonyloxy)benzoic acid-4'-substituent phenyl ester, 4-(4-substituent cyclohexyl)benzoic acid-4'-substituent phenyl ester, 4-(4-substituent cyclohexyl)benzoic acid-4'-substituent cyclohexyl ester, 4-substituent-4'-substituent biphenyl. Among the above chemical compounds used are multicomponent mixed liquid crystal compositions having at least in one end of the molecule alkyl group, alkoxy group, alkoxy methylene group, cyano group, fluoro group, difluoro group, and trifluoro group.

Instead of the polyimide alignment layer formed by alignment treatment with rubbing as described above, it is possible to use an inorganic alignment layer having an alignment capability formed by an oblique vapor deposition method. Thereby, the alignment capability of not producing alignment unevenness can be obtained on both substrate surfaces of the pair of substrates without increasing the temperature of the liquid crystal components even if the liquid crystal component in liquid crystal phase is injected. Liquid crystal molecules on the alignment controlled surface formed by the oblique vapor deposition method have a very weak anchoring strength in the azimuthal direction compared to the liquid crystal molecules on the generally used polyimide alignment layer formed by alignment treatment with rubbing. Therefore, the after image (in-plane switching after image) representing a special problem in the in-plane switching mode can be reduced by the weak anchoring strength in the azimuthal direction.

One of advantages of the in-plane switching mode is in the wide viewing angle which becomes wider as the tilt angle of the liquid crystal molecules on the substrate surface becomes smaller, and theoretically becomes the widest viewing angle when the tilt angle is 0°. However, in the case of the organic alignment layer formed by alignment treatment with rubbing, it is difficult to set the tilt angle of the liquid crystal molecules on the substrate surface to 0°. On the other hand, in the case of the inorganic alignment layer which has an alignment capability formed by an oblique vapor deposition method, it is known that the tilt angle of the liquid crystal molecules on the substrate surface can be easily set to nearly 0°. This is the advantage of the inorganic alignment layer.

Further, as another alignment layer material to obtain a weak anchoring strength in the azimuthal direction as described above, it is possible to employ a photoreactive material layer, particularly, a photoreactive alignment layer subjected to polarized light irradiation treatment so as to selectively produce a photochemical reaction.

In general, photoreactive alignment has been regarded as an aligning method in which it is difficult to produce a strong anchoring strength in the azimuthal direction and a sufficient boundary surface tilt angle (above several degrees). However, the weak anchoring strength in the azimuthal direction is advantageous to the present invention. Further, in contrast to the conventional twisted nematic mode typical of the vertical electric field mode, the in-plane switching mode does not need boundary surface tilt in principle. Therefore, it is possible to improve the practicality, such as the productivity, by combining the features of the photoreactive alignment layer with those of the in-plane switching mode.

Furthermore, it is known that in the in-plane switching mode, the viewing angle becomes wider as the boundary surface tilt angle becomes smaller, and in the photoreactive alignment layer, the boundary surface tilt angle becomes very small. These are advantageous to the present invention, and result in a better viewing angle characteristic.

By premixing a polymer precursor curable by irradiation of light, heat or radiation rays into the photoreactive alignment layer material and performing the above-mentioned curing treatment at the time of, before or after the photo alignment treatment, the modulus of elasticity of the photoreactive alignment layer can be increased to further decrease the in-plane after image which is special problem in the in-plane switching mode. As another method, instead of mixing the polymer precursor as described above, it is possible to attain the object of the present invention by interposing a transparent organic polymer layer having a thickness which is thicker than that of the photo alignment layer between the photo alignment layer and the substrate to increase the modulus of elasticity of the total alignment layer.

The present invention will be described further in detail below, according to various embodiments.

[Embodiment 1]

Using two surface-finished transparent glass substrates having a thickness of 1.1 mm as substrates, thin film transistors and wiring electrodes capable of applying an in-plane electric field were formed on one of the substrates, and an insulator preventive film made of silicon nitride was further formed on the uppermost surface. The structure of the thin film transistor and the various kinds of electrodes is shown in FIG. 4 in a front view as seen from a direction perpendicular to the substrate surface, and in the cross-sectional side views of FIGS. 4A and 4B, which are taken on the planes of the lines A–A' and B–B' of the front view.

The thin film transistor element 14 is composed of pixel electrodes (source electrodes) 4, a signal electrode (drain electrode) 3, a scanning electrode (gate electrode) 12 and amorphous silicon 13. Common electrodes 1 and the scanning electrode 12, and the signal electrode 3 and the pixel electrode 4 are respectively formed by patterning the same metallic layer.

Figure 4:
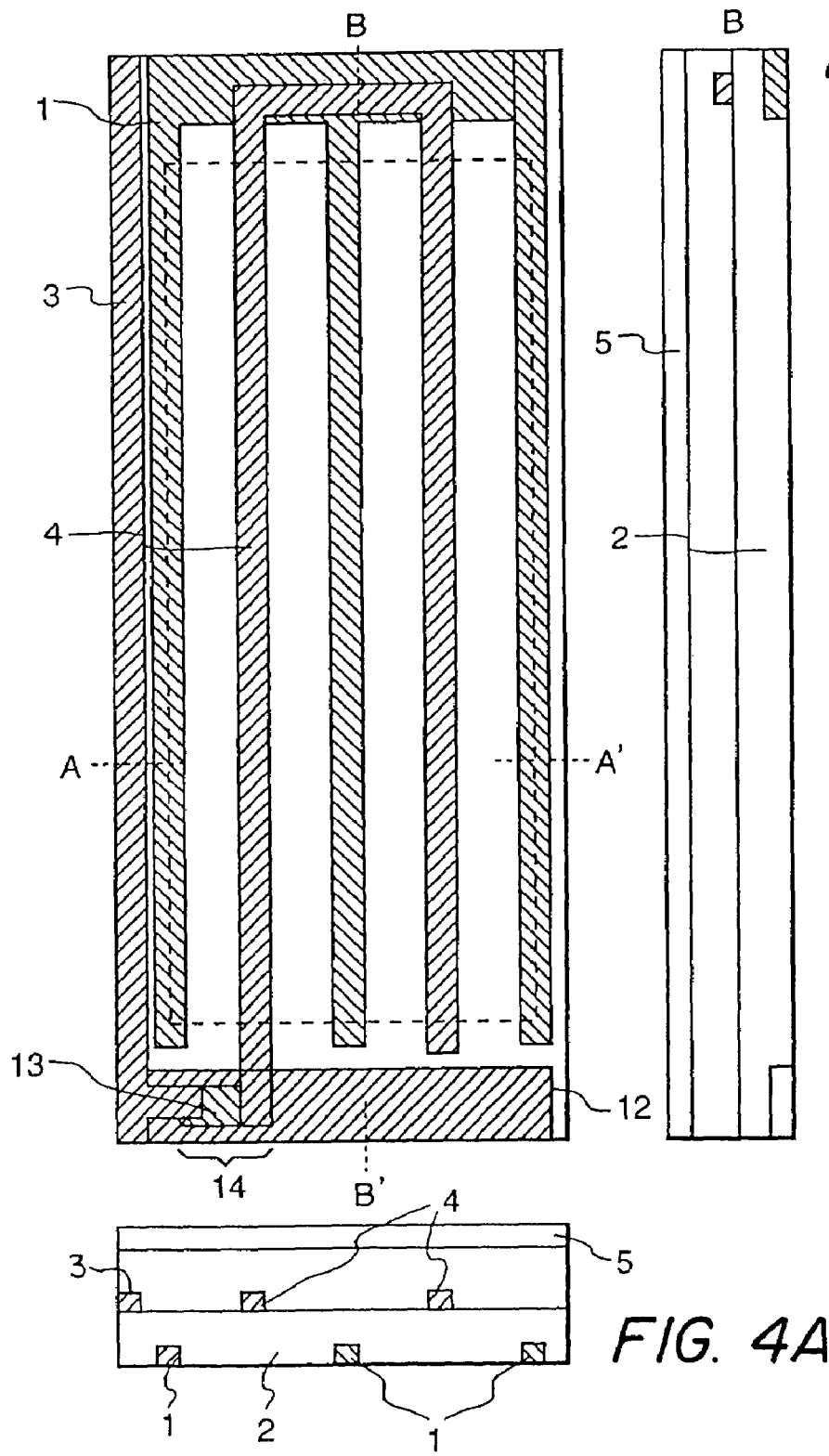
FIG. 4 is a front sectional view showing the structure of a thin film transistor, electrodes and wiring as seen from a direction perpendicular to the substrate surface.

Referring to FIG. 4, the pixel electrodes 4 are arranged between the three common electrodes 1. The pixel pitch is 100 μm in the horizontal direction, that is, between the signal electrodes 3, and 300 μm in the vertical direction, that is, between the scanning electrodes 12. The widths of wiring electrodes extending over a plurality of pixels, that is, the electrodes for the scanning electrode, the signal electrode and wiring portion of the common electrode (portion extending parallel to the scanning electrode), are set to be slightly wide in order to avoid wiring defects.

The widths for the scanning electrode, the signal electrode and wiring portion of the common electrode are 10 μm, 8 μm and 8 μm, respectively.

On the other hand, the widths of the pixel electrodes independently form one pixel unit base in order to improve the opening ratio, and the portions extending in the longitudinal direction of the signal wiring electrode of the common electrode are slightly narrowed and are set to 5 μm and 6 μm, respectively. Narrowing the widths of the electrodes increases the probability of line breaks caused by the entering of extraneous particles, but such a case is limited to local loss of one pixel and does not cause a line defect. There is a gap of 2 μm between the signal electrode and the common electrode. The number of signal wiring electrodes is 640×3 (R, G, B) and the number of wiring electrodes is 480, and accordingly, the total number of the pixels is 640×3×480.

In regard to the alignment layer being used, a polyamic acid varnish was obtained by dissolving p-phenylene-diamine of 1.0 mole % in N-methyl-2-pyrrolidone, and adding pyromellitic acid anhydride of 1 mole % to the solution to react for 12 hours at 20° C. The polyamic acid varnish had a weight average molecular weight of approximately 100,000 in a standard styrene base, and a weight average molecular weight/number average molecular weight ($M_W/M_N$) of approximately 1.6. A closely packed polyimide alignment layer of approximately 800 Å was formed by diluting the varnish to a 6% concentration, adding γ-aminopropyl-triethoxy-silane of 0.3 weight % in a sold base, and then printing and performing heat treatment of 210° C./30 minutes.

Then, a liquid crystal alignment function was produced by rubbing treatment of the surface of the alignment layer using buff cloth attached to a rubbing roller.

A color filter with a black matrix layer was formed on the other of the substrates and a polyimide alignment layer was formed on the uppermost surface in a similar manner to that described above, and then the liquid crystal alignment function was produced by rubbing treatment.

Although the rubbing method is used as the method of producing the alignment function in this embodiment, instead of the rubbing method it is also possible to employ, for example, a method in which an ultraviolet-curable polymer solution is applied to form an alignment layer and then the liquid crystal alignment function is produced by irradiating polarized ultraviolet rays on the alignment layer to cause a photochemical reaction, or a method in which an organic molecular film expanded on a water surface is scooped up on a substrate to form a well-aligned multilayer film used as an alignment layer.

The latter two methods have been regarded as alignment methods in which it is difficult to produce a sufficiently large boundary surface tilt angle, but in contrast to the conventional twisted nematic mode typical of the vertical electric field mode, the in-plane switching mode does not need boundary surface tilt in principle. Therefore, it is possible to improve the practicality, such as the productivity, by combining the features of the alignment layer with those of the in-plane switching mode.

Next, a cell was assembled by arranging the two substrates so that the surfaces having the liquid crystal alignment function face each other, and interposing and dispersing spherical polymer beads between the substrates, followed by applying a sealant to the peripheral portions. The rubbing directions of the two substrate were nearly parallel to each other and were set so that the angle to the direction of the applied in-plane electric field-became 75°. A nematic liquid crystal composition A was injected into the cell under a vacuum condition, and the cell was sealed with a sealant made of a UV-curable resin. The nematic liquid crystal composition A had an anisotropy of dielectric constant $\Delta\in$ of positive and 10.2 (1 kHz, 20° C.), an anisotropy of refractive index $\Delta n$ of 0.075 (wavelength of 590 nm, 20° C.), a twist elastic constant $K_2$ of 7.0 pN, and a nematic-isotropic phase transition temperature T(N-I) of approximately 76° C. The thickness (gap) of the liquid crystal layer in the liquid crystal panel was 4.8 μm. The retardation of the panel ($\Delta n$ d) was 0.36 μm. A homogenous alignment cell was fabricated using the same alignment layer and the same liquid crystal composition used in the panel, and the liquid crystal pretilt angle was measured by a crystal rotation method. The result showed approximately 3 degrees. The panel was sandwiched with two polarizing plates (G1220DU; a product of Nitto Denko Co.), and the axis of passing polarized light in one of the polarizing plates was set in a direction nearly parallel to the rubbing direction described above and the axis of the other of the polarizing plates was set so as to intersect with the direction at a right angle. Then, the panel was connected with a drive circuit, a back light and so on to form a module, and an active matrix type liquid crystal display apparatus was obtained. In this embodiment, the active matrix type liquid crystal display apparatus was set in the normal closed mode where a dark level was displayed by a low voltage and a light level was displayed by a high voltage.

Image retention and after image problems of the liquid crystal display apparatus fabricated in such a way were evaluated by quantitative measurement using an oscilloscope combined with a photo-diode. Initially, a window pattern was displayed on the screen at maximum brightness for 30 minutes. Then, the whole screen was switched to a gray level so that the brightness became 10% of the maximum brightness, at which an after image typically appeared most conspicuously. The time duration until the pattern in the edge portion of the window disappeared was evaluated as an after image time, and the magnitude of the brightness change $\Delta B/B(10\%)$ of the brightness B in the after image portion of the window to the peripheral gray portion was evaluated as an after image intensity. Therein, the allowable after image intensity was below 3%.

The result showed that the after image intensity $\Delta B/B$ (10%) of the brightness change was approximately 2%, and the time until the after image disappeared was approximately 50 milliseconds, which was nearly equal to the response time of approximately 35 milliseconds of the liquid crystal used there. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

Figure 5:
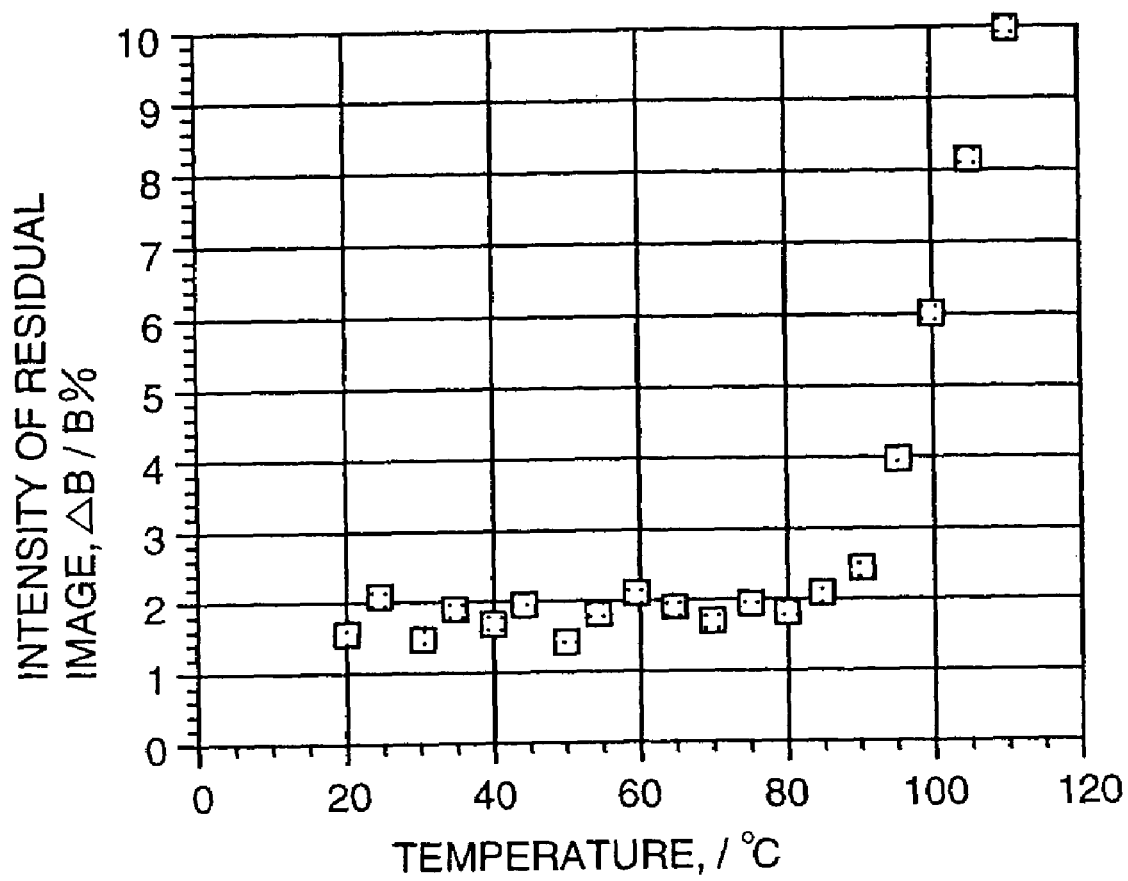
FIG. 5 is a graph showing the temperature dependence of the intensity of the after image.

Further, in order to evaluate the glass transition temperature Tg of the boundary surface of the liquid crystal and the alignment layer of the liquid crystal display element, the temperature dependence of the brightness change $\Delta B/B$ (10%) (after image intensity) was measured using a hot stage. The result showed that the brightness change $\Delta B/B$ (10%) was a constant value below 3% within a range from room temperature to approximately 73° C. which was near the nematic isotropic transition temperature T(N-I) of the liquid crystal composition A being used. Further, the temperature dependence of a boundary surface Tg was measured using a liquid crystal display element which was fabricated using another liquid crystal composition B. The liquid crystal composition B had a twist elastic constant and an anisotropy of dielectric constant $\Delta\in$ nearly equal to those of the liquid crystal composition A and a higher T(N-I) point of 115° C., and the other parameters of the liquid crystal cell forming process and materials were the same as those of the liquid crystal composition A. As a result, as shown in FIG. 5, the brightness change $\Delta B/B(10\%)$ gradually increases near a point exceeding 100° C. and reaches approximately 10% at 100° C. From the above result, it can be understood that the glass transition temperature Tg of the boundary surface of the liquid crystal display element used in this embodiment is approximately 100° C., which is higher than the T(N-I) point of 76° C. of the liquid crystal composition A.

[Embodiment 2]

This embodiment is similar to Embodiment 1 except for the alignment layer which is used. Polyamic acid varnish was obtained by dissolving m-phenylene-diamine of 1.0 mole % in N-methyl-2-pyrrolidone, and adding 3,3',4,4'-diphenyl-ether carboxylic acid anhydride of 1 mole % to the solution to react for 6 hours at 40° C. The polyamic acid varnish had a weight average molecular weight of approximately 21,000 in a standard styrene base, and a weight average molecular weight/number average molecular weight ($M_W/MN$) of approximately 1.8. A closely packed polyimide alignment layer of approximately 600 Å was formed by diluting the varnish to 6% concentration, adding γ-amino-propyl-triethoxy-silane of 0.3 weight % in a sold base, and then printing and performing heat treatment of 225° C./30 minutes.

The surface modulus of elasticity of a polyimide alignment layer obtained through the same fabrication method as described above was evaluated using a scanning viscoelasticity microscope (hereinafter, referred to as a SVM) apparatus. Here, the principle of the surface modulus of elasticity measurement will be briefly described. The SVM is an application of the atomic force microscope (hereinafter, referred to as an AFM) generally well known in recent years. In a region where a repulsive force acts between a probe needle of the AFM and a sample surface, that is, in a state where the probe needle deforms the surface, a sinusoidal vibration (strain) is forcibly given to the sample using a piezoelectric element and a vibration response (stress) having the same frequency is detected from the probe needle. A dynamic viscoelastic function of the sample surface is evaluated from the amplitudes and a phase difference of the stress and the strain signals. The details of this procedure are described in a paper by Keiji Tanaka et al. in The Transaction of Polymer, Vol. 53 No. 10, 1996, p582.

The surface modulus of elasticity of the above-mentioned polyimide alignment layer at 10 Hz was measured using the apparatus and a resultant value of approximately 2.5 GPa was obtained.

Similar to the case of Embodiment 1, image retention and after image problems in the liquid crystal display apparatus fabricated in such a way were evaluated by quantitative measurement using an oscilloscope combined with a photo-diode. Initially, a window pattern was displayed on the screen at maximum brightness for 30 minutes. Then, the whole screen was switched to a gray level so that the brightness became 10% of the maximum brightness at which the after image typically appeared most conspicuously. The time until the pattern in the edge portion of the window disappeared was evaluated as an after image time, and the magnitude of the brightness change ΔB/B(10%) of the brightness B in the after image, portion of the window to the peripheral gray portion was evaluated as an after image intensity. Therein, the allowable after image intensity was below 3%.

The result showed that the after image intensity ΔB/B (10%) of the brightness change was approximately 3%, and the time duration until the after image disappeared was approximately 62 milliseconds, which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

Further, by the same method as in Embodiment 1, the glass transition temperature Tg of the boundary surface of the liquid crystal and the alignment layer of the liquid crystal display element was evaluated. The result showed that the glass transition temperature Tg of the boundary surface is approximately 90° C., which is higher than the T(N-I) point of 76° C. of the liquid crystal composition A.

[Embodiment 3]

This embodiment is similar to Embodiment 1 except for the alignment layer being used. Polyamic acid varnish was prepared by dissolving 4,4'-diamino-diphenyl methane of 1.0 mole % in a mixed solvent of N-methyl-2-pyrrolidone and dimethylacetamide, and adding 1,2,3,4-cyclopenthane carboxylic acid anhydride of 1 mole % to the solution to react for 12 hours at 30° C. The polyamic acid varnish had a weight average molecular weight of approximately 12,000 to 250,000 in a standard styrene base. After that, using gel permeation chromatography, the varnish was classified and collected to obtain a single disperse polyamic acid varnish having a weight average molecular weight of approximately 150,000, and a weight average molecular weight/number average molecular weight ($M_W/M_N$) of approximately 1.51. A closely packed polyimide alignment layer of approximately 600 Å was formed by diluting the varnish to 6% concentration, adding γ-aminopropyl-triethoxy-silane of 0.3 weight % in a sold base, and then printing and performing heat treatment of 220° C./30 minutes. Further, a homogenous alignment cell was fabricated using the same alignment layer and the same liquid crystal composition used in the panel, and the liquid crystal pretilt angle was measured by a crystal rotation method. The result showed an angle of approximately 1.5 degrees.

Similar to the case of Embodiment 1, image retention and after image problems in the liquid crystal display apparatus fabricated in such a way were evaluated by quantitative measurement using an oscilloscope combined with a photo-diode. Initially, a window pattern was displayed on the screen at maximum brightness for 30 minutes. Then, the whole screen was switched to a gray level so that the brightness became 10% of the maximum brightness at which the after image typically appeared most conspicuously. The time duration until the pattern in the edge portion of the window disappeared was evaluated as an after image time, and the magnitude of the brightness change ΔB/B(10%) of the brightness B in the after image portion of the window to the peripheral gray portion was evaluated as an after image intensity. Therein, the allowable after image intensity was below 3%.

The result showed that the after image intensity ΔB/B (10%) of the brightness change was approximately 2%, and the time until the after image disappeared was approximately 48 milliseconds, which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

Next, using the same alignment layer material as the liquid crystal display apparatus obtained in such a manner, a liquid crystal cell was fabricated by forming and treating with rubbing an alignment layer on a glass substrate through the same process, followed by sealing the liquid crystal composition. Then, the extrapolation length representing the anchoring strength in the azimuthal direction between the liquid crystal molecules in the boundary surface and the surface of the alignment layer was measured by the Freedericksz transition method (Young, Rosenbratt, Applied Physics Letters, Vol. 43, 1983, p62), and the result was 1.0 μm.

The principle of the method of measuring the extrapolation length by the Freedericksz transition method will be described below. This measuring method is a method of measuring an extrapolation length from Equation 1 (Yokoyama, Molecular Crystal and Liquid Crystal, Vol. 165, p265 (1988), and Oh-e, Kondo; Applied Physics Letters, Vol. 67, p3895 (1995)) expressing a liquid crystal layer thickness d dependence on a threshold voltage $V_c$ of the alignment change (Freedericksz transition) to the in-plane electric field of the liquid crystal molecules in the in-plane switching mode, which can be approximately obtained when anchoring strengths in the azimuthal direction in both boundary surfaces between the liquid crystal layer and a pair of substrates.

$$(1/V_c) = (d+2b) \times \pi g \sqrt{(\Delta \epsilon / K_2)} \qquad (1)$$

where d and g are a gap between the substrates (a thickness of the liquid crystal layer) and a gap between the electrode terminals, respectively, and $K_2$ and ΔÅ are the twist modulus of elasticity and the anisotropy of dielectric constant, respectively, and b is the extrapolation length representing the strength of twist coupling between the liquid crystal molecules in the boundary surface and the surface of the alignment layer defined by the following equation using the surface anchoring strength in the azimuthal direction $A_2$.

$$b = K_2/A_2 \quad (2)$$

The extrapolation length b becomes smaller as the surface anchoring strength in the azimuthal direction is stronger. For example, when the surface anchoring strength in the azimuthal direction is so strong that the alignment direction of the liquid crystal molecules are thought to be fixed on the surface of the alignment layer, the extrapolation length b is 0 (zero).

According to the equation, when a plurality of liquid crystal cells having only a different thickness d of the liquid crystal layer are fabricated and measured values of $(1/V_C)$ for the respective liquid crystal cells are plotted by taking d along the abscissa (x-axis) and the measured value along the ordinate (y-axis), an intercept obtained by extrapolating a straight line passing on the plotted points gives –2b, that is, the extrapolation length (in this case, the coefficient 2 expresses the contribution of both boundary surface to the extrapolation length when the upper and the lower boundary surface are assumed to be the same).

In principle, this method can produce an accurate measure only in a case of a weak anchoring strength in the azimuthal direction, that is, when the extrapolation length is nearly equal to the thickness of the liquid crystal layer.

As methods of measuring the extrapolation length which are capable of being applied to a case of a strong anchoring strength in the azimuthal direction, there are a high field technique (Yokoyama, Fan Sprang; Journal of Applied Physics, Vol. 57, p452 (1985)) and a method of measuring weak twist in a boundary surface (Akahane, Kaneko, Kimura; Journal of Applied Physics of Japan, Vol. 35, p4434 (1996)). However, in the case of the weak anchoring strength in the azimuthal direction, as is within the scope of the present invention, either of the measuring methods can give a measured result having a sufficient accuracy.

From the extrapolation length obtained in such a manner, the ratio b*=b/d of the extrapolation length b to the gap d becomes 0.217 when the center gap is 4.6 μm.

The anchoring strength in the azimuthal direction $A_2$ at the alignment layer surface can be directly obtained from the following equation derived from Equation (2) using the extrapolation length b and the twist elastic constant $K_2$ of the liquid crystal.

$$A_2 = K_2/b \quad (3)$$

Therefore, $A_2$ in the present embodiment is 7.0 μN/m.

[Embodiment 4]

This embodiment is similar to Embodiment 1 except for the alignment layer being used. Polyamideimide varnish was obtained by dissolving 4-fluoro-metaphenylenediamine of 1.0 mole % in N-methyl-2-pyrrolidone, and adding 3,3', 4,4'-biscyclobutane tetra-carboxylic acid anhydride of 1 mole % to the solution to react for 8 hours at 20° C. and for 2 hours at 100° C. The polyamideimide varnish had a weight average molecular weight of approximately 17,000 in a standard styrene base, and a weight average molecular weight/number average molecular weight ($M_W/M_N$) of approximately 1.85. A closely packed polyimide alignment layer of approximately 600 Å was formed by diluting the varnish to a 6% concentration, adding γ-aminopropyl-triethoxy-silane of 0.3 weight % in a sold base, and then printing and performing heat treatment of 200° C./30 minutes, with the result that a liquid crystal display apparatus having a thickness d of the liquid crystal layer of 4.2 μm was fabricated. Further, a homogenous alignment cell was fabricated using the same alignment layer and the same liquid crystal composition as was used in the panel, and the liquid crystal pretilt angle was measured by a crystal rotation method. The result showed approximately 4 degrees.

Similar to the case of Embodiment 1, image retention and after image problems in the liquid crystal display apparatus fabricated in such a way were evaluated by quantitative measurement using an oscilloscope combined with a photodiode. Initially, a window pattern was displayed on the screen at maximum brightness for 30 minutes. Then, the whole screen was switched to a gray level so that the brightness became 10% of the maximum brightness at which the after image typically appeared most conspicuously. A time until the pattern in the edge portion of the window disappeared was evaluated as an after image time, and the magnitude of the brightness change ΔB/B(10%) of the brightness B in the after image portion of the window to the peripheral gray portion was evaluated as an after image intensity. Therein, the allowable after image intensity was below 3%.

The result showed that the after image intensity ΔB/B (10%) of the brightness change was approximately 2%, and the time duration until the after image disappeared was approximately 55 milliseconds, which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

Further, by the same method as in Embodiment 1, the glass transition temperature Tg of the boundary surface of the liquid crystal and the alignment layer of the liquid crystal display element was evaluated. The result showed that the glass transition temperature Tg of the boundary surface is approximately 105° C., which is higher than the T(N-I) point of 76° C. of the liquid crystal composition A. Further, similar to Embodiment 2, the surface modulus of elasticity of the above-mentioned polyimide alignment layer at 50 Hz was measured using a scanning viscoelasticity microscope (SVM) apparatus and a resultant value of approximately 5 Gpa was obtained.

[Embodiment 5]

This embodiment is similar to Embodiment 1 except for the alignment layer material being used. A liquid crystal panel having a liquid crystal layer thickness (gap) d of 5.0 μm was fabricated. The retardation (Δn d) of the panel was 0.375 μm.

An inorganic alignment layer material was used. A inorganic alignment layer made of silicon oxide was formed on the uppermost surface of an insulator preventive film made of silicon nitride in a substrate on the thin film transistor side by an oblique vapor deposition method.

The oblique vapor deposition was performed using a louver ("The Physical Property of Polymer (3)—Surface, Boundary Surface and Film, Transfer—New Experimental Science for Polymer, Vol. 10, edited by the Society of Polymer Science, Japan) for restricting the direction of vapor deposition so that an angle to the normal of the substrate become 60° in order to set the tilt angle of the liquid crystal alignment to nearly 0°.

A color filter with a black matrix layer was formed on the other of the substrates, and a polyimide alignment layer was formed on the uppermost surface. Then, the surface of the alignment layer was treated with rubbing using a buff cloth attached to a rubbing roller to produce the liquid crystal alignment function.

The polyimide alignment layer was formed by printing and forming a solution of PIQ, a product of Hitachi Chemical Industry, Ltd., of a polyimide precursor of solvent soluble type, and then performing heat treatment at 210° C./30 minutes.

Further, the extrapolation length b was measured by the Freedericksz method similar to Embodiment 3, and it was 1.6 μm.

It is well known from a separate experiment that the twist coupling between the surface rubbing the polyimide alignment layer PIQ and the liquid crystal molecules is very strong, and the extrapolation length in the boundary surface is nearly 0 (zero). Therefore, it is believed that most of the extrapolation lengths are a contribution of the inorganic alignment layer formed by the oblique vapor deposition of silicon oxide.

The ratio b* of the extrapolation length b to the gap d became 0.32 when the center gap was 5.0 μm. The anchoring strength in the azimuthal direction $A_2$ in the alignment layer surface was 4.38 μN/m.

Similar to the case of Embodiment 1, image retention and after image problems the liquid crystal display apparatus fabricated in such a way were evaluated by quantitative measurement using a window pattern. The result showed that the after image intensity ΔB/B(10%) of the brightness change was approximately 3%, and the time duration until the after image disappeared was approximately 50 milliseconds which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

[Embodiment 6]

This embodiment is similar to Embodiment 1 except for the alignment layer being used. Using a mixture of a composition shown by (Chemical Formula 2) containing a diazo-benzene group as a diamine chemical composition and 4,4'-diaminodiphenyl-methane in equal mole ratio, acid anhydride of pyromellitic acid anhydride and/or 1,2,3,4-cyclobutane-teracarbonic acid anhydride formed a polyamic acid.

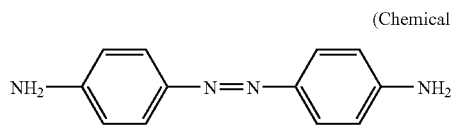

(Chemical Formula 2)

The polyamic acid was applied onto the surface of the substrate, and then an imide was formed by burning for 30 minutes at 200° C. and polarized light having a wavelength of 420 nm was irradiated thereon.

After that, a nematic liquid crystal composition was sealed similar to the case of Embodiment 1, and annealing was performed for 10 minutes at 100° C. to obtain a liquid crystal alignment in a direction nearly perpendicular to the direction of the irradiation polarized light.

Through the method described above, a liquid crystal display apparatus having a liquid crystal layer thickness of 4.0 μm was obtained. Further, a homogenous alignment cell was fabricated using the same alignment layer and the same liquid crystal composition used in the panel, and the liquid crystal pretilt angle was measured by a crystal rotation method. The result showed an angle of approximately 1 degree.

Further, by the same method as in Embodiment 1, the glass transition temperature Tg of the boundary surface of the liquid crystal and the alignment layer of the liquid crystal display element was evaluated. The result showed that the glass transition temperature Tg of the boundary surface is approximately 85° C., which is higher than the T(N-I) point of 76° C. of the liquid crystal composition A. Similar to the case of Embodiment 1, image retention and after image problems in the liquid crystal display apparatus fabricated in such a way were evaluated by quantitative measurement using a window pattern. The result showed that the after image intensity ΔB/B(10%) of the brightness change was approximately 3%, and the time duration until the after image disappeared was approximately 50 milliseconds, which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

Further, the extrapolation length b was measured by the Freedericksz method similar to Embodiment 3, and it was 1.0 μm. The ratio b* of the extrapolation length b to the gap d was 0.25. From the value of elastic constant $K_2$ to the twist deformation of the liquid crystal composition being used and the extrapolation length b described above, the anchoring strength in the azimuthal direction $A_2$ in the alignment layer surface in this embodiment was 5.0 μN/m.

[Embodiment 7]

This embodiment is similar to Embodiment 1 except for the alignment layer used. Using a mixture of a composition shown by (Chemical Formula 3) containing stilbene group as a diamine chemical composition and 4,4'-diamino-diphenyl-methane in equal mole ratio, an acid anhydride of pyromellitic acid anhydride and/or 1,2,3,4-cyclobutane-teracarbonic acid anhydride formed a polyamic acid.

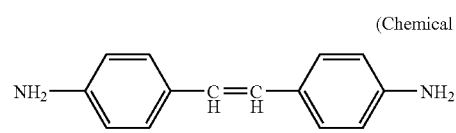

(Chemical Formula 3)

The polyamic acid was applied onto the surface of the substrate, and then an imide was formed by burning for 30 minutes at 210° C. and polarized light having a wavelength of 308 nm was irradiated thereon.

After that, a nematic liquid crystal composition was sealed similar to the case of Embodiment 1, and annealing was performed for 10 minutes at 100° C. to obtain liquid crystal alignment in a direction nearly perpendicular to the direction of the irradiation polarized light.

Through the method described above, a liquid crystal display apparatus having a liquid crystal layer thickness of 4.0 μm was obtained. Further, a homogenous alignment cell was fabricated using the same alignment layer and the same liquid crystal composition used in the panel, and the liquid crystal pretilt angle was measured by a crystal rotation method. The result showed an angle of approximately 1 degree.

Further, by the same method as in Embodiment 1, the glass transition temperature Tg of the boundary surface of the liquid crystal and the alignment layer of the liquid crystal display element was evaluated. The result showed that the glass transition temperature Tg of the boundary surface is approximately 80° C., which is higher than the T(N-I) point of 76° C. of the liquid crystal composition A. Similar to the case of Embodiment 1, image retention and after image problems in the liquid crystal display apparatus fabricated in such a way were evaluated by quantitative measurement using a window pattern. The result showed that the after image intensity ΔB/B(10%) of the brightness change was approximately 3%, and the time duration until the after image disappeared was approximately 48 milliseconds, which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

[Embodiment 8]

Using a mixture of a diamine chemical composition containing an acetylene group in addition to the same diamine chemical composition containing a stilbene group as in Embodiment 7 and 4,4'-diamino-diphenyl-methane in equal mole ratio, an acid anhydride of pyromellitic acid anhydride and/or 1,2, 3,4-cyclobutane-teracarbonic acid anhydride formed a polyamic acid. The polyamic acid was applied onto the surface of the substrate, and then an imide was formed by burning for 30 minutes at 210° C. and polarized light having a wavelength of 308 nm was irradiated using an Xe—Cl$_2$ excimer laser.

After that, a nematic liquid crystal composition was sealed similar to the case of Embodiment 1, and annealing was performed for 10 minutes at 100° C. to obtain liquid crystal alignment in a direction nearly perpendicular to the direction of the irradiation polarized light.

Through the method described above, a liquid crystal display apparatus having a liquid crystal layer thickness of 4.0 μm was obtained. Further, a homogenous alignment cell was fabricated using the same alignment layer and the same liquid crystal composition as was used in the panel, and the liquid crystal pretilt angle was measured by a crystal rotation method. The result showed an angle of approximately 1 degree.

Further, by the same method as in Embodiment 1, the glass transition temperature Tg of the boundary surface of the liquid crystal and the alignment layer of the liquid crystal display element was evaluated. The result is that the glass transition temperature Tg of the boundary surface is approximately 100° C., which is higher than the T(N-I) point of 76° C. of the liquid crystal composition A. Similar to the case of Embodiment 1, image retention and after image problems in the liquid crystal display apparatus fabricated in such a way were evaluated by quantitative measurement using a window pattern. The result showed that the after image intensity ΔB/B(10%) of the brightness change was approximately 2%, and the time duration until the after image disappeared was approximately 40 milliseconds, which was nearly equal to the response time of approximately 35 milliseconds of the liquid crystal used there. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

[Embodiment 9]

This embodiment is similar to Embodiment 1 except for the alignment layer being used. Polyamic acid varnish was prepared by dissolving p-phenylene-diamine of 1.0 mole % in N-methyl-2-pyrrolidone, and adding pyromellic acid anhydride of 1 mole % to the solution to react for 12 hours at 20° C. The polyamic acid varnish had a weight average molecular weight of approximately 250,000 in a standard styrene base, and a weight average molecular weight/number average molecular weight ($M_H/M_N$) of approximately 1.8. A closely packed polyimide alignment layer of approximately 800 Å was formed by diluting the varnish to a 6% concentration, adding γ-aminopropyl-triethoxy-silane of 0.3 weight % in a sold base, and then printing and performing heat treatment at 220° C./30 minutes.

The glass transition temperature Tg of the polyimide alignment layer obtained by the same method as described above was measured, and the result was approximately 380° C.

Next, similar to the case of Embodiment 1, image retention and after image problems in the liquid crystal display apparatus fabricated in such a way were evaluated by quantitative measurement using an oscilloscope combined with a photo-diode. Initially, a window pattern was displayed on the screen at the maximum brightness for 30 minutes. Then, the whole screen was switched to a gray level so that the brightness became 10% of the maximum brightness at which the after image typically appeared most conspicuously. The time duration until the pattern in the edge portion of the window disappeared was evaluated as an after image time, and the magnitude of the brightness change ΔB/B(10%) of the brightness B in the after image portion of the window to the peripheral gray portion was evaluated as an after image intensity. Therein, the allowable after image intensity was below 3%.

The result showed that the after image intensity ΔB/B (10%) of the brightness change was approximately 2%, and the time duration until the after image disappeared was approximately 50 milliseconds, which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

[Embodiment 10]

This embodiment is similar to Embodiment 1 except for the alignment layer being used. Polyamic acid varnish was prepared by m-phenylene-diamine of 1.0 mole % in N-methyl-2-pyrrolidone, and adding 3,3',4,4'-diphenylether-tetra-carboxylic acid anhydride of 1 mole % to the solution to react for 6 hours at 40° C. The polyamic acid varnish had a weight average molecular weight of approximately 21,000 in a standard styrene base, and a weight average molecular weight/number average molecular weight ($M_W/M_N$) of approximately 1.5. A closely packed polyimide alignment layer of approximately 700 Å was formed by diluting the varnish to a 6% concentration, adding γ-aminopropyl-tri-ethoxy-silane of 0.3 weight % in a sold base, and then printing and performing heat treatment at 210° C./30 minutes.

The glass transition temperature Tg of the polyimide alignment layer obtained by the same method as described above was measured, and the result was approximately 310° C.

Next, similar to the case of Embodiment 1, the image retention and after image problems in the liquid crystal display apparatus fabricated in such a way were evaluated by quantitative measurement using an oscilloscope combined with a photo-diode. Initially, a window pattern was displayed on the screen at maximum brightness for 30 minutes. Then, the whole screen was switched to a gray level so that the brightness became 10% of the maximum brightness at which the after image typically appeared most conspicuously. A time duration until the pattern in the edge portion of the window disappeared was evaluated as an after image time, and the magnitude of the brightness change ΔB/B(10%) of the brightness B in the after image portion of the window to the peripheral gray portion was evaluated as an after image intensity. Therein, the allowable after image intensity was below 3%.

The result showed that the after image intensity ΔB/B (10%) of the brightness change was approximately 3%, and the time duration until the after image disappeared was approximately 56 milliseconds, which was nearly equal to the response time of approximately 35 milliseconds of the liquid crystal used there. In a visual screen after image inspection, no display unevenness due to an after image was observed, and a high quality display characteristic could be obtained. As described above, by using the above-mentioned alignment layer, it was possible to obtain a liquid crystal display element capable of reducing the display defects of image retention and after image in the display.

[Embodiment 11]

This embodiment is similar to Embodiment 1 except for the alignment layer being used. Polyamic acid varnish was prepared by dissolving 4,4'-diamino-diphenyl methane of 1.0 mole % in a mixed solvent of N-methyl-2-pyrrolidone and dimethylacetamide, and adding 1,2,3,4-cyclopenthane carboxylic acid anhydride of 1.0 mole % to the solution to react for 12 hours at 30° C. The polyamic acid varnish had a weight average molecular weight of approximately 15,000 to 250,000 in a standard styrene base. After that, using gel permeation chromatography, the varnish was classified and collected to single disperse a polyamic acid varnish having a weight average molecular weight of approximately 200,000, and a weight average molecular weight/number average molecular weight ($M_W/M_N$) of approximately 1.05. A closely packed polyimide alignment layer of approximately 700 Å was formed by diluting the varnish to a 6% concentration, adding γ-aminopropyl-triethoxy-silane of 0.3 weight % in a sold base, and then printing and performing heat treatment of 220° C./30 minutes.

The glass transition temperature Tg of the polyimide alignment layer obtained by the same method as described above was measured, and the result was approximately 380° C.

Similar to the case of Embodiment 1, the image retention and after image problems in the liquid crystal display apparatus fabricated in such a way were evaluated by quantitative measurement using an oscilloscope combined with a photodiode. Initially, a window pattern was displayed on the screen at maximum brightness for 30 minutes. Then, the whole screen was switched to a gray level so that the brightness became 10% of the maximum brightness at which the after image typically appeared most conspicuously. A time until the pattern in the edge portion of the window disappeared was evaluated as an after image time, and the magnitude of the brightness change ΔB/B(10%) of the brightness B in the after image portion of the window to the peripheral gray portion was evaluated as an after image intensity. Therein, the allowable after image intensity was below 3%.

The result showed that the after image intensity ΔB/B (10%) of the brightness change was approximately 2%, and the time duration until the after image disappeared was approximately 48 milliseconds, which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing display defects of image retention and after image in the display.

[Embodiment 12]

This embodiment is similar to Embodiment 1 except for the alignment layer being used. Polyamideimide varnish was prepared by dissolving 4-fluoro-metaphenylenediamine of 1.0 mole % in N-methyl-2-pyrrolidone, and adding 3,3',4,4'-bisayclobutane tetra-carboxylic acid anhydride of 1.0 mole % to the solution to react for 8 hours at 20° C. and for 2 hours at 100° C. The polyamideimide varnish had a weight average molecular weight of approximately 12,000 in standard styrene base, and a weight average molecular weight/number average molecular weight ($M_W/M_N$) of approximately 1.95. A closely packed polyimide alignment layer of approximately 600 Å was formed by diluting the varnish to a 6 % concentration, adding γ-aminopropyl-triethoxy-silane of 0.3 weight % in a sold base, and then printing and performing heat treatment at 200° C./30 minutes, and a liquid crystal display apparatus wherein the thickness d of the liquid crystal layer is 4.0 μm was fabricated. Further, a homogenous alignment cell was fabricated using the same alignment layer and the same liquid crystal composition used in the panel, and the liquid crystal pretilt angle was measured by a crystal rotation method. The result showed an angle of approximately 4 degrees.

The glass transition temperature Tg of the polyimide alignment layer obtained by the same method as described above was measured, and the result was approximately 310° C.

Similar to the case of Embodiment 1, the image retention and after image problems in the liquid crystal display apparatus fabricated in such a way were evaluated by quantitative measurement using an oscilloscope combined with a photodiode. Initially, a window pattern was displayed on the screen at maximum brightness for 30 minutes. Then, the whole screen was switched to a gray level so that the brightness became 10% of the maximum brightness at which the after image typically appeared most conspicuously. The time duration until the pattern in the edge portion of the window disappeared was evaluated as an after image time, and the magnitude of the brightness change ΔB/B(10%) of the brightness B in the after image portion of the window to the peripheral gray portion was evaluated as an after image intensity. Therein, the allowable after image intensity was below 3%.

The result showed that the after image intensity ΔB/B (10%) of the brightness change was approximately 3%, and the time duration until the after image disappeared was approximately 60 milliseconds, which was nearly equal to the response time of approximately 35 milliseconds of the liquid crystal being used. In a visual screen after image inspection, no display unevenness due to an after image was observed, and a high quality display characteristic could be obtained. As described above, by using the above-mentioned alignment layer, it was possible to obtain a liquid crystal display element capable of reducing display defects of image retention and after image in the display.

[Comparison 1]

Polyamic acid varnish was prepared by polymerizing 2,2'-bis{4-(p-aminophenoxy)phenyl}propane of 1.0 mole % and 3,3', 4,4'-benzophenone-tetracarboxylic acid anhydride of 1.0 mole % in N-methyl-2-pyrrolidone for 10 hours at 20° C. The polyamic acid varnish had a weight average molecular weight of approximately 200,000 in a standard styrene base, and a weight average molecular weight/number average molecular weight ($M_W/M_N$) of approximately 1.9. A closely packed polyimide alignment layer of approximately 800 Å was formed by diluting the varnish to a 6% concentration, adding γ-aminopropyl-triethoxy-silane of 0.3 weight % in sold base, and then printing and performing heat treatment at 220° C./30 minutes. The glass transition temperature Tg of the polyimide alignment layer obtained by the same method as described above was measured, and the result was approximately 240° C. Further, a homogenous alignment cell was fabricated using the same alignment layer and the same liquid crystal composition used in the liquid crystal display apparatus, and the liquid crystal pretilt angle was measured by a crystal rotation method. The result showed an angle of approximately 7 degrees.

Similar to the case of Embodiment 1, the image retention and after image problems in the liquid crystal display apparatus fabricated in such a way were evaluated by quantitative measurement using an oscilloscope combined with a photodiode. Initially, a window pattern was displayed on the screen at maximum brightness for 30 minutes. Then, the whole screen was switched to a gray level so that the brightness became 10% of the maximum brightness at which the after image typically appeared most conspicuously. The time duration until the pattern in the edge portion of the window disappeared was evaluated as an after image time, and a magnitude of the brightness change ΔB/B(10%) of the brightness B in the after image portion of the window to the peripheral gray portion was evaluated as an after image intensity. Therein, the allowable after image intensity was below 3%.

The result showed that the after image intensity ΔB/B (10%) of the brightness change was as large as approximately 5%, and the time duration until the after image disappeared was approximately 60 minutes. In a visual screen after image inspection, display unevenness due to an after image was clearly observed. As described above, by using the above-mentioned alignment layer, the display defects of image retention and after image were clearly observed in the display.

By the same method as in the case of Embodiment 1, the Tg of the boundary surface between the liquid crystal and the alignment layer was obtained, and the Tg of the boundary surface was approximately 58° C., which is lower than the T(N-I) point of 76° C. of the liquid crystal composition A. Further, similar to Embodiment 2, the surface modulus of elasticity of the above-mentioned polyimide alignment layer at 10 Hz was measured using a scanning viscoelasticity microscope (SVM) apparatus, and a resultant value of approximately 0.1 GPa was obtained.

[Comparison 2]

Polyamic acid varnish was prepared by polymerizing 2,2'-bis{4-(p-aminophenoxy)phenyl}octane of 0.5 mole %, 4,4'-diamino-diphenylmethane of 0.5 mole % and 3,3',4,4'-biphenyl-tetracarboxylic acid anhydride of 1.0 mole % in N-methyl-2-pyrrolidone for 8 hours at 20° C. The polyamic acid varnish had a weight average molecular weight of approximately 40,000 in a standard styrene base, and a weight average molecular weight/number average molecular weight ($M_W/M_N$) of approximately 1.8. A closely packed polyimide alignment layer of approximately 800 Å was formed by diluting the varnish to a 6% concentration, and adding γ-aminopropyl-triethoxy-silane of 0.3 weight % in sold base, and then printing and performing heat treatment of 200° C./30 minutes. The glass transition temperature Tg of the polyimide alignment layer, obtained by the same method as described above, was measured, and the result was approximately 230° C.

Similar to the case of Embodiment 1, the image retention and after image problems in the liquid crystal display apparatus fabricated in such a way were evaluated by quantitative measurement using an oscilloscope combined with a photodiode. Initially, a window pattern was displayed on the screen at maximum brightness for 30 minutes. Then, the whole screen was switched to a gray level so that the brightness became 10% of the maximum brightness at which the after image typically appeared most conspicuously. The time duration until the pattern in the edge portion of the window disappeared was evaluated as an after image time, and a magnitude of the brightness change ΔB/B(10%) of the brightness B in the after image portion of the window to the peripheral gray portion was evaluated as an after image intensity. Therein, the allowable after image intensity was below 3%.

The result showed that the after image intensity ΔB/B (10%) of the brightness change was as large as approximately 8%, and the time duration until the after image disappeared was approximately 120 minutes. In a visual screen after image inspection, display unevenness due to an after image was clearly observed. As described above, by using the above-mentioned alignment layer, the display defects of image retention and after image were clearly observed in the display.

By the same method as in the case of Embodiment 1, the Tg of the boundary surface between the liquid crystal and the alignment layer was obtained, and the Tg of the boundary surface was approximately 60° C., which is lower than the T(N-I) point of 76° C. of the liquid crystal composition A. Further, similar to Embodiment 2, the surface modulus of elasticity of the above-mentioned polyimide alignment layer at 10 Hz was measured using a scanning viscoelasticity microscope (SVM) apparatus, and a resultant value of approximately 0.08 GPa was obtained.

[Comparison 3]

Polyamic acid varnish was prepared by polymerizing 2,2'-bis{4-(p-aminophenoxy)phenyl}hexafluoropropane of 1.0 mole % and 4,4'-diamino-diphenyl ether of 1.0 mole % in N-methyl-2-pyrrolidone for 6 hours at 20° C. The polyamic acid varnish had a weight average molecular weight of approximately 4,000 in a standard styrene base, and a weight average molecular weight/number average molecular weight ($M_W/M_N$) of approximately 3.5. A closely packed polyimide alignment layer of approximately 900 Å was formed by diluting the varnish to a 6% concentration, adding γ-aminopropyl-triethoxy-silane of 0.3 weight % in a sold base, and then printing and performing heat treatment of 200° C./30 minutes. Further, a homogenous alignment cell was fabricated using the same alignment layer and the same liquid crystal composition used in the liquid crystal display apparatus, and the liquid crystal pretilt angle was measured by a crystal rotation method. The result showed an angle of approximately 8 degrees.

Similar to the case of Embodiment 1, the image retention and after image problems in the liquid crystal display apparatus fabricated in such a way were evaluated by quantitative measurement using an oscilloscope combined with a photodiode. Initially, a window pattern was displayed on the screen at maximum brightness for 30 minutes. Then, the whole screen was switched to a gray level so that the brightness became 10% of the maximum brightness at which the after image typically appeared most conspicuously. The time duration until the pattern in the edge portion of the window disappeared was evaluated as an after image time, and the magnitude of the brightness change $\Delta B/B(10\%)$ of the brightness B in the after image portion of the window to the peripheral gray portion was evaluated as an after image intensity. Therein, the allowable after image intensity was below 3%.

The result showed that the after image intensity $\Delta B/B$ (10%) of the brightness change was as large as approximately 20%, and the time duration until the after image disappeared was approximately 100 minutes. In a visual screen after image inspection, display unevenness due to an after image was clearly observed. As described above, by using the above-mentioned alignment layer, the display defects of image retention and after image were clearly observed in the display.

By the same method as in the case of Embodiment 1, the Tg of the boundary surface between the liquid crystal and the alignment layer was obtained, and the Tg of the boundary surface was approximately 50° C., which is lower than the T(N-I) point of 76° C. of the liquid crystal composition A. Further, similar to Embodiment 2, the surface modulus of elasticity of the above-mentioned polyimide alignment layer at 10 Hz was measured using a scanning viscoelasticity microscope (SVM) apparatus, and a resultant value of approximately 0.1 GPa was obtained.

[Comparison 4]

Polyamic acid varnish was prepared by polymerizing 2,2'-bis{4-(p-aminophenoxy)phenyl}hexafluoropropane of 1.0 mole % and 4,4'-diamino-diphenyl ether of 1.0 mole % in N-methyl-2-pyrrolidone for 6 hours at 20° C. The polyamic acid varnish had a weight average molecular weight of approximately 8,000 in a standard styrene base, and a weight average molecular weight/number average molecular weight ($M_W/M_N$) of approximately 3.5. A closely packed polyimide alignment layer of approximately 800 Å was formed by diluting the varnish to a 6% concentration, adding γ-aminopropyl-triethoxy-silane of 0.3 weight % in a sold base, and then printing and performing heat treatment of 200° C./30 minutes.

The glass transition temperature Tg of the polyimide alignment layer, obtained by the same method as described above, was measured, and the result was approximately 200° C.

Similar to the case of Embodiment 1, the image retention and after image problems of the liquid crystal display apparatus fabricated in such a way were evaluated by quantitative measurement using an oscilloscope combined with a photodiode. Initially, a window pattern was displayed on the screen at maximum brightness for 30 minutes. Then, the whole screen was switched to a gray level so that the brightness became 10% of the maximum brightness at which the after image typically appeared most conspicuously. The time duration until the pattern in the edge portion of the window disappeared was evaluated as an after image time, and the magnitude of the brightness change $\Delta B/B(10\%)$ of the brightness B in the after image portion of the window to the peripheral gray portion was evaluated as an after image intensity. Therein, the allowable after image intensity was below 3%.

The result showed that the after image intensity $\Delta B/B$ (10%) of the brightness change was as large as approximately 6%, and the time duration until the after image disappeared was approximately 100 minutes. In a visual screen after image inspection, display unevenness due to an after image was clearly observed. As described above, by using the above-mentioned alignment layer, the display defects of image retention and after image were clearly observed in the display.

As described above, according to the present invention, it is possible to reduce the occurrence of image retention and an after image, which are special problems of an in-plane switching liquid crystal display apparatus operated by applying an electric field in a direction nearly parallel to the substrates so as to pass through the liquid crystal layer, and it is possible to provide an active matrix type liquid crystal display apparatus which produces a high quality image having less display unevenness due to image sticking and an after image and which has an advantageous productivity.

What is claimed is:

1. An active matrix liquid crystal display apparatus having a plurality of switching elements, which comprises:
    a pair of substrates, at least one of said substrates being transparent;
    a liquid crystal layer arranged between said pair of substrates;
    an electrode structure for generating an electric field having a dominant component parallel to a surface of said substrate and passing through said liquid crystal layer, wherein said electrode structure is formed on one of said pair of subtrates;
    a pair of alignment layers formed on respective surfaces in contact with said liquid crystal layer of said pair of substrates; and
    a pair of polarizing plates arranged so as to sandwich said pair of substrates,
    wherein a surface modulus of elasticity of said pair of alignment layers is not less than 1 G Pa, and at least one of said pair of alignment layers is a photoreactive layer, and
    wherein a parameter d·Δn of said liquid crystal layer arranged between said pair of polarizing plates satisfies the relation 0.2 μm<d·Δn<0.5 μm, where Δn is an anisotropy of refractive index and d is a thickness of said liquid crystal layer.

2. An active matrix liquid crystal display apparatus according to claim 1, wherein an anchoring strength $A_2$ in the azimuthal direction of a surface of said alignment layer to liquid crystal molecules at the boundary surface between said alignment layer and said liquid crystal layer is less than 20 μN/m.

3. An active matrix liquid crystal display apparatus according to claim 1, wherein alignment directions of liquid crystal molecules at the two boundary surfaces between said liquid crystal layer and said pair of substrates are nearly the same direction.

4. An active matrix liquid crystal display apparatus according to claim 1, wherein at least one of said pair of alignment layers is made of an organic polymer of a polyamic acid imide group, polyimide group, polyimide siloxane group and polyamide imide group.

5. An active matrix liquid crystal display apparatus according to claim 4, wherein a weight average molecular weight of said organic polymer is not smaller than 10,000 and not larger than 300,000.

6. An active matrix liquid crystal display apparatus according to claim 1, wherein at least one of said pair of alignment layers is an organic polymer having a polydispersity coefficient expressed by a ratio of weight average molecular weigh/number average molecular weight which is not larger than 2.

7. An active matrix liquid crystal display apparatus according to claim 6, wherein said alignment layer is made of an organic polymer of dehydration ring closure of polyamic acid composed of diamine compounds and tetracarboxylic acid anhydride, total number including bonding groups in the meta position and in the ortho position of bonding groups of —O—, —S—, —CH$_2$—, —C(CH$_3$)$_2$—, —C(CF$_3$)$_2$—, —SO$_2$— making molecular axis of the polymer rotatable in the repeating structure of the organic polymer being less than 3.

8. An active matrix liquid crystal display apparatus according to claim 1, wherein at least one of said pair of alignment layers is an inorganic material layer.

9. An active matrix liquid crystal display apparatus according to claim 1, wherein a pretilt angle of said liquid crystal layer is not larger than 5 degrees.

10. An active matrix liquid crystal display apparatus having a plurality of switching elements, which comprises:
 a pair of substrates, at least one of said substrates being transparent;
 a liquid crystal layer arranged between said pair of substrates;
 an electrode structure including a plurality of electrodes having a predetermined spacing for generating an electric field having a dominant component parallel to a surface of said substrate and passing through said liquid crystal layer, wherein said electrode structure is formed on one of said pair of substrates;
 a pair of alignment layers formed on respective surfaces in contact with said liquid crystal layer of said pair of substrates; and
 a pair of polarizing plates arranged so as to sandwich said pair of substrates,
 wherein a glass transition temperature Tg of a material forming the surface of at least one said pair of alignment layers is higher than a nematic-isotropic phase transition temperature T(N-I) of a liquid crystal composite forming said liquid crystal layer, and at least one of said pair of alignment layers is a photoreactive layer, and
 wherein a parameter d·Δn of said liquid crystal layer arranged between said pair of polarizing plates satisfies the relation 0.2 μm<d·Δn<0.5 μm, where Δn is an anisotropy of refractive index and d is a thickness of said liquid crystal layer.

11. An active matrix liquid crystal display apparatus according to claim 10, wherein at least one of said pair of alignment layers is a layer of photoreactive material which has been subjected to polarized light irradiation in order to control an orientation of said liquid crystal layer.

12. An active matrix liquid crystal display apparatus according to claim 11, wherein said photoreactive material layer comprises an organic polymer containing at least one of a polymer and an oligomer containing at least one kind of diazobenzene group and derivatives of a diazobenzene group.

13. An active matrix liquid crystal display apparatus according to claim 11, wherein said photoreactive material layer comprises an organic polymer containing at least one of a polymer and an oligomer containing at least one kind of stilbene group and derivatives of a stilbene group.

14. An active matrix liquid crystal display apparatus according to claim 11, wherein said photoreactive material is an organic polymer containing any one of a polymer precursor and a polymer curable by performing irradiation treatment of at least one of heat, light and radiation rays.

15. An active matrix liquid crystal display apparatus according to claim 14, wherein said one of a polymer precursor and a polymer has any one of a ethylene group, acetylene group, diacetylene group and maleimide group.

16. An active matrix liquid crystal display apparatus according to claim 14, wherein a transparent organic polymer layer having a thickness thicker than the thickness of said alignment layer is interposed between said alignment layer formed of said photoreactive material layer and said substrate having said alignment layer.

17. An active matrix liquid crystal display apparatus having a plurality of switching elements, which comprises:
 a pair of substrates, at least one of said substrates being transparent;
 a liquid crystal layer arranged between said pair of substrates;
 an electrode structure for generating an electric field having a dominant component parallel to a surface of said substrate and passing through said liquid crystal layer, wherein said electrode structure is formed on one of said pair of substrates;
 a pair of alignment layers formed on respective surfaces in contact with said liquid crystal layer of said pair of substrates; and
 a pair of polarizing plates arranged so as to sandwich said pair of substrates,
 wherein a glass transition temperature Tg of said alignment layer is not lower than 300 C, and at least one of said pair of alignment layers is a photoreactive layer, and
 wherein a parameter d·Δn of said liquid crystal layer arranged between said pair of polarizing plates satisfies the relation 0.2 μm<d·Δn<0.5 μm, where Δn is an anisotropy of refractive index and d is a thickness of said liquid crystal layer.

18. An active matrix liquid crystal display apparatus according to claim 17, wherein an anchoring strength $A_2$ in the azimuthal direction of a surface of said alignment layer to liquid crystal molecules at the boundary surface between said alignment layer and said liquid crystal layer is less than 20 μN/m.

19. An active matrix liquid crystal display apparatus according to claim 17, wherein alignment directions of liquid crystal molecules at the two boundary surfaces between said liquid crystal layer and said pair of substrates are nearly the same direction.

20. An active matrix liquid crystal display apparatus according to claim 17, wherein at least one of said pair of alignment layers is made of an organic polymer of a polyamic acid imide group, polyimide group, polyimide siloxane group and polyamide imide group.

21. An active matrix liquid crystal display apparatus according to claim 20, wherein a weight average molecular weight of said organic polymer is not smaller than 10,000 and not larger than 300,000.

22. An active matrix liquid crystal display apparatus according to claim 17, wherein at least one of said pair of alignment layers is an organic polymer having a polydispersity coefficient expressed by a ratio of weight average molecular weight/number average molecular weigh which is not larger than 2.

23. An active matrix liquid crystal display apparatus according to claim 22, wherein said alignment layer is made of an organic polymer of dehydration ring closure of polyamic acid composed of diamine compounds expressed by the chemical formula of H$_2$N—R—NH$_2$ and tetracarboxylic acid anhydride, total number including bonding groups in the meta position and in the ortho position of bonding groups of —O—, —S—, —CH$_2$—, —C(CH$_3$)$_2$—, —C(CF$_3$)$_2$—, —SO$_2$— making molecular axis of the polymer rotatable in R and X in the repeating structure of the organic polymer being less than 3, said tetracarboxylic acid anhydride being expressed by the following chemical formula

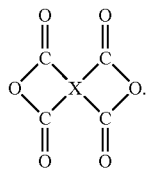

24. An active matrix liquid crystal display apparatus according to claim 17, wherein at least one of said pair of alignment layers is an inorganic material layer.

25. An active matrix liquid crystal display apparatus according to claim 17, wherein a pretilt angle of said liquid crystal layer is not larger than 5 degrees.

26. An active matrix liquid crystal display apparatus comprising:
a pair of substrates;
a liquid crystal layer arranged between the pair of substrates;
an electrode structure for generating an electric field having a dominant component parallel to respective surfaces of the pair of substrates and passing through the liquid crystal layer, wherein the electrode structure is formed on one of the pair of substrates;
a pair of alignment layer formed on respective surfaces of the pair of substrates in contact with the liquid crystal layer; and
a pair of polarizing plates arranged so as to sandwich the pair of substrates;
wherein at least one of the pair of alignment layers is a photoreactive material layer,
wherein a parameter d·Δn of said liquid crystal layer arranged between said pair of polarizing plates satisfies the relation 0.2 μm<d·Δn<0.5 μm, where Δn is an anisotropy of refractive index and d is a thickness of said liquid crystal layer, and wherein a pretilt angle of said liquid crystal layer is not larger than 5 degrees.

27. An active matrix liquid crystal display apparatus according to claim 26, wherein an anchoring strength A$_2$ in the azimuthal direction of a surface of said alignment layer to liquid crystal molecules at the boundary surface between said alignment layer and said liquid crystal layer is less than 20 μN/m.

28. An active matrix liquid crystal display apparatus according to claim 26, wherein alignment directions of liquid crystal molecules at the two boundary surfaces between said liquid crystal layer and said pair of substrates are nearly the same direction.

29. An active matrix liquid crystal display apparatus according to claim 26, wherein at least one of said pair of alignment layers is made of an organic polymer of a polyamic acid imide group, polyimide group, polyimide siloxane group and polyamide imide group.

30. An active matrix liquid crystal display apparatus according to claim 29, wherein a weight average molecular weight of said organic polymer is not smaller than 10,000 and not larger than 300,000.

31. An active matrix liquid crystal display apparatus according to claim 26, wherein at least one of said pair of alignment layers is an organic polymer having a polydispersity coefficient expressed by a ratio of weight average molecular weight/number average molecular weight which is not larger than 2.

32. An active matrix liquid crystal display apparatus according to claim 31, wherein said alignment layer is made of an organic polymer of dehydration ring closure of polyamic acid composed of diamine compounds and tetracarboxylic acid anhydride, total number including bonding groups in the meta position and in the ortho position of bonding groups of —O—, —S—, —CH$_2$—, —C(CH$_3$)$_2$—, —C(CF$_3$)$_2$—, —SO$_2$— making molecular axis of the polymer rotatable in the repeating structure of the organic polymer being less than 3

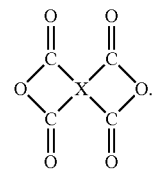

33. An active matrix liquid crystal display apparatus according to claim 26, wherein at least one of said pair of alignment layers is an inorganic material layer.

* * * * *